July 26, 1932.  E. ROSENBERG  1,869,079
DEVICE FOR MECHANICALLY OPERATED WELDING
Filed May 17, 1929
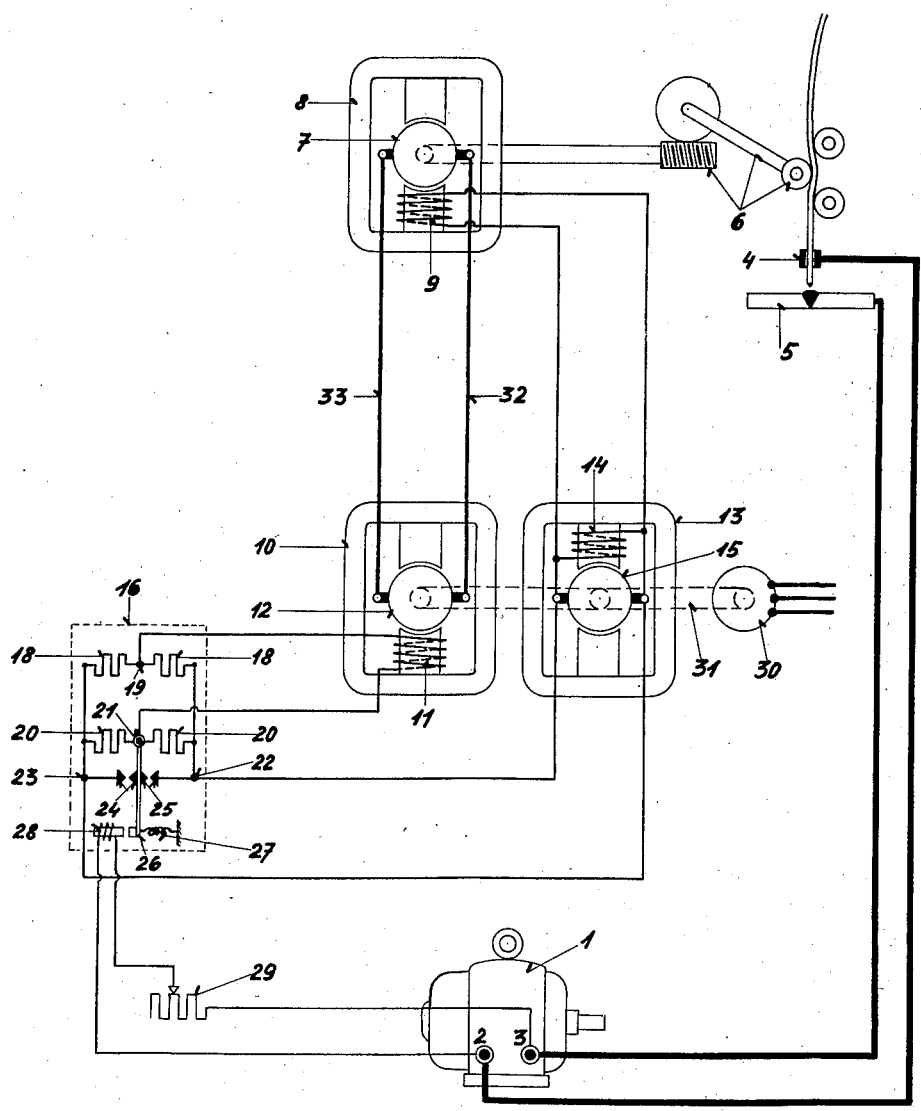
E. Rosenberg
INVENTOR
By: Marks & Clerk
ATTYS Patented July 26, 1932

1,869,079

UNITED STATES PATENT OFFICE

EMANUEL ROSENBERG, OF WEIZ, AUSTRIA

DEVICE FOR MECHANICALLY-OPERATED WELDING

Application filed May 17, 1929, Serial No. 364,010, and in Austria May 25, 1928.

This invention relates to devices for mechanically-operated welding.

In mechanically-operated electric-arc welding the carbon or wire electrodes are as a rule moved up to the work-piece by means of an electric motor, in such a manner that the electrode is pushed forward when the voltage of the arc is too great, and arrested or drawn back when the voltage is too low. This has been usually effected up to the present by operating on the main circuit of the motor. A cut-out or change-over switch for the armature-circuit is commonly provided, operated indirectly by a relay under the influence of the voltage of the arc. In welding with wire-electrodes the said motor drives rollers which not only push the wire forward, but at the same time straighten it. The inertia involved here is disadvantageous. It is possible for the motor to assume such speed, when the arc is too long, that the electrode is pushed forward too fast and brought into complete contact with the work-piece, which, in the case of wire-electrodes, can cause the extinction of the arc and the fusion of electrode and work-piece. On the other hand it can also happen that the motor runs so slowly that the arc becomes too long and extinguishes before the motor has regained sufficient speed to bring the wire up to the work.

According to the present invention the regulation is effected in the exciting circuit of a small dynamo in such a manner that by regulating a small current and low voltage powerful accelerating and decelerating forces can be brought to bear on the feed-motor, and it becomes possible to use quite small, reliable and at the same time economical regulators.

In the embodiment of the present invention the armature of a direct-current feed motor is supplied with current from a small control generator. The exciting-circuits of both motor and dynamo are preferably fed by a separate exciter-dynamo. The excitation of the control generator is governed by an automatic shunt field rheostat capable of admitting positive excitation from zero onwards, as also negative excitation to a certain limited extent. If the voltage of the exciter remains constant, the speed of the feed motor will increase in proportion to the intensity of excitation of the control generator. If it is running at a certain speed, and the excitation of the control generator is increased, acceleration takes place. If the excitation of the generator is diminished deceleration takes place. If the excitation of the generator is reversed the counter-torque and retardation can become very considerable, and the motor has the tendency to turn in the opposite direction. The accelerating and braking forces which can be produced in this manner are so great that the inertia of motor and gearing can be effectively overcome by them.

In the accompanying drawing the figure represents a diagrammatic view of the invention. 1 is a dynamo with two terminals 2, 3 which feed the arc burning between the movable electrode 4 and the work piece 5. The electrode 4 is moved by the armature 7 of the feed motor 8 through the gearing 6, 9 being the field coil of the motor. The armature 12 of the control generator 10 and the armature 15 of the exciting dynamo 13 are arranged together with the armature of the motor 30 on a common shaft 31. The armature 7 of the feed motor 8 is supplied with current from the armature 12 of the control generator 10 through solid conductors 32 and 33. The field coil 9 of the feed motor and the coil 11 exciting the field structure of the control generator are supplied with current from the armature 15 of the exciting dynamo, of which the field coil 14 is here shown as a shunt winding. The coil 11 of the control generator is so controlled by the automatic regulator 16 that the exciting current may attain any value from a certain positive to a certain negative value. For instance, the ends of two rheostats 18 and 20 are connected to the brushes of the exciter armature, while the ends of coil 11 are connected to intermediate points 19 and 21 of the rheostats 18 and 20. Each half of the rheostat 20 can be short circuited by contacts 24 and 25, the vibrating lever 26 carrying the moving contacts being exposed to the action of a spring 27 and a counteracting magnet 28, the coil of which, in series with an adjustable rheostat 29, is connected in shunt to the terminals 2 and 3. The point 19 of the rheostat 18 will have a potential intermediate between the potentials of the two exciter brushes. If the contacts 24 are closed the potential of point 21 will be identical with that of point 23 and the voltage impressed on coil 11 will be of opposite direction but not necessarily of the same value as if the contacts 25 are closed, connecting point 21 to point 22. The vibrating lever will, as it is well known (Tirrill-regulators) according to the number and time of contact periods give an average exciting current of any desired value from the predetermined maximum positive to the predetermined maximum negative value. The double acting vibrating regulator with divided rheostat 18 is used here only as an illustration. Instead of this, any other well known arrangement may be used which allows the continuous regulation of a current from a certain positive to a certain negative value.

The feed motor can possess a series field winding in addition to the automatically regulated exciter-winding. The automatic regulator is preferably a high-speed regulator, for instance a Tirrill-regulator. It can also consist of built-up carbon plates which offer more or less contact resistance according to the pressure to which they are submitted. The voltage-coil of the regulator is connected with or without series resistance in parallel with the arc.

I claim:—

1. A device for mechanically operated arc welding consisting of a work piece, an electrode, an electric motor with an armature, means to feed and withdraw said electrode by movement of said armature, a generator with an armature, uninterrupted conductors between the armatures of the generator and motor, a field structure in said generator and means to vary automatically in size and direction the field in said structure dependent on the voltage between electrode and work piece.

2. A device for mechanically operated arc welding consisting of a work piece, an electrode, rolls driving the electrode, an electric motor with an armature geared to said rolls, a generator with an armature, uninterrupted conductors between the armatures of the generator and motor, a field structure in said generator and means to vary automatically in size and direction the field in said structure dependent on the voltage between electrode and work piece.

3. A device for mechanically operated arc welding consisting of a work piece, an electrode, an electric motor with an armature, means to drive said electrode by movement of said armature, a generator with an armature, uninterrupted conductors between the armatures of the generator and motor, a field structure in said generator and means to control the field in said structure dependent on the voltage between electrode and work piece in such a manner that the field of strength varies in size and direction with the difference of said voltage from a predetermined value.

4. A device for mechanically operated arc welding consisting of a work piece, an electrode, rolls driving the electrode, an electric motor with an armature geared to said rolls, a generator with an armature, uninterrupted conductors between the armatures of the generator and motor, a field structure in said generator and an automatic regulator controlling the field in said structure dependent on the voltage between electrode and work piece in such a manner that the field strength varies in size and direction with the difference of said voltage from a predetermined value.

5. A device for mechanically operated arc welding consisting of a work piece, an electrode, an electric motor with an armature, means to feed and withdraw by the movement of the armature said electrode, a generator with an armature, conductors between the armatures of the generator and motor, the generator having an exciting coil and means to vary automatically the current through said exciting coil in accordance with the voltage between the electrode and work piece.

6. A device for mechanically operated arc welding comprising a work piece, an electrode and an electric motor with an armature, means to feed and withdraw by the movement of the armature said electrode, a regulator acting under the influence of the voltage between electrode and work piece, a generator with a field structure and an armature, conductors between the armatures of generator and motor, said regulator controlling the excitation of the field structure in such a manner that the excitation varies from a high positive value at high arc voltage to a negative value at excessively low arc voltage.

In testimony whereof I have affixed my signature.

EMANUEL ROSENBERG.